(12) United States Patent
Champaigne et al.

(10) Patent No.: US 8,479,568 B1
(45) Date of Patent: Jul. 9, 2013

(54) APPARATUS FOR MEASURING VARIATIONS IN FLATNESS

(75) Inventors: Jack Champaigne, Mishawaka, IN (US); David Francis, West Chester, PA (US)

(73) Assignees: Electronics, Inc., Mishawaka, IN (US); Metal Improvement Company, LLC, Paramus, NJ (US)

( * ) Notice: Subject to any disclaimer, the term of this patent is extended or adjusted under 35 U.S.C. 154(b) by 194 days.

(21) Appl. No.: 13/041,682

(22) Filed: Mar. 7, 2011

Related U.S. Application Data

(60) Provisional application No. 61/311,020, filed on Mar. 5, 2010.

(51) Int. Cl.
*G01B 5/28* (2006.01)
*G01B 3/22* (2006.01)
*G01B 5/00* (2006.01)

(52) U.S. Cl.
USPC ............... 73/104; 73/105; 73/866; 73/866.5; 73/11.01; 73/11.02

(58) Field of Classification Search
USPC ...... 73/104, 105, 11.01, 11.02, 11.03; 33/533
See application file for complete search history.

(56) References Cited

U.S. PATENT DOCUMENTS

| 5,317,811 | A | * | 6/1994 | Berwick | 33/507 |
| 5,339,534 | A | * | 8/1994 | Krayenhagen | 33/533 |
| 5,471,762 | A | * | 12/1995 | Miller et al. | 33/833 |
| 5,687,487 | A | * | 11/1997 | Johnson | 33/501.02 |
| 5,761,823 | A | * | 6/1998 | Williamson et al. | 33/832 |
| 5,877,405 | A | * | 3/1999 | Champaigne | 73/11.02 |
| 6,148,532 | A | * | 11/2000 | Ellis | 33/533 |
| 6,289,713 | B1 | * | 9/2001 | Champaigne | 73/1.79 |
| 7,726,035 | B2 | * | 6/2010 | Chang et al. | 33/551 |
| 2009/0025463 | A1 | * | 1/2009 | McFarland et al. | 73/104 |
| 2009/0107211 | A1 | * | 4/2009 | Hasselberg et al. | 73/11.02 |
| 2012/0199506 | A1 | * | 8/2012 | Beach et al. | 206/305 |

* cited by examiner

*Primary Examiner* — Hezron E Williams
*Assistant Examiner* — Alexander Mercado
(74) *Attorney, Agent, or Firm* — Botkin & Hall, LLP

(57) ABSTRACT

An apparatus for measuring variations in the flatness of an Almen strip holding surface includes a gaging block having opposing parallel surfaces defining an aperture extending between said parallel surfaces and substantially conforming to the size of the holding surface. A plunger is mounted in a cross member which extends across the aperture and is moved along opposite sides thereof. A dial indicator responds to displacement of the aperture to permit detection of any variation in flatness as the plunger is moved over the holding surface and along and between the side and end edges thereof. Placement of the Almen strip holding screws is verified to be in tolerance by the gaging block in that the gaging block cannot be mounted on the holding surface if the distance between the openings is out of tolerance.

5 Claims, 5 Drawing Sheets

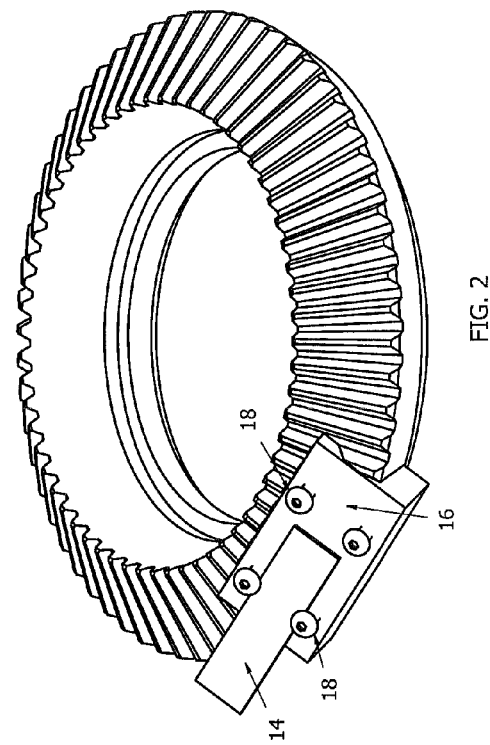
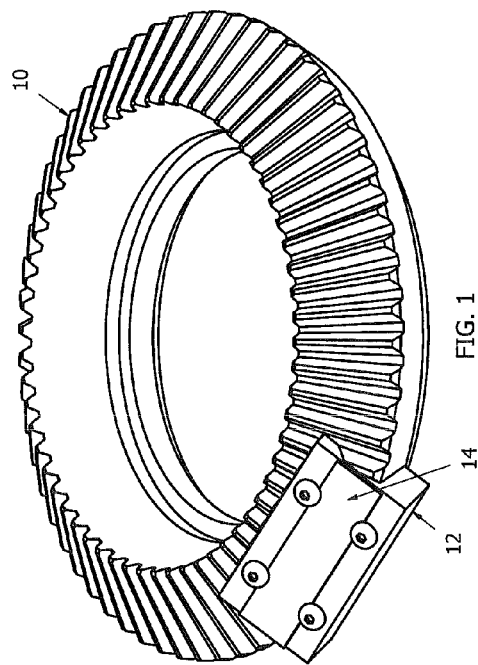

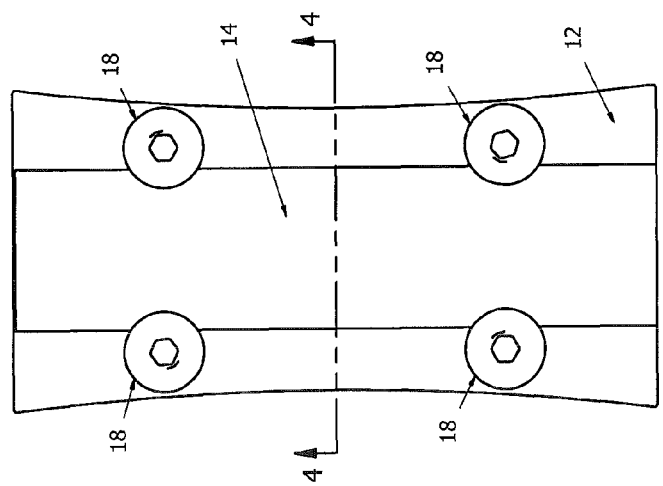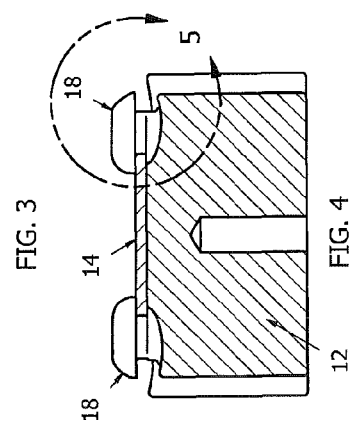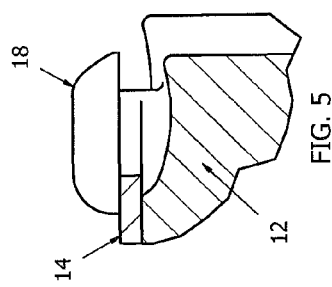

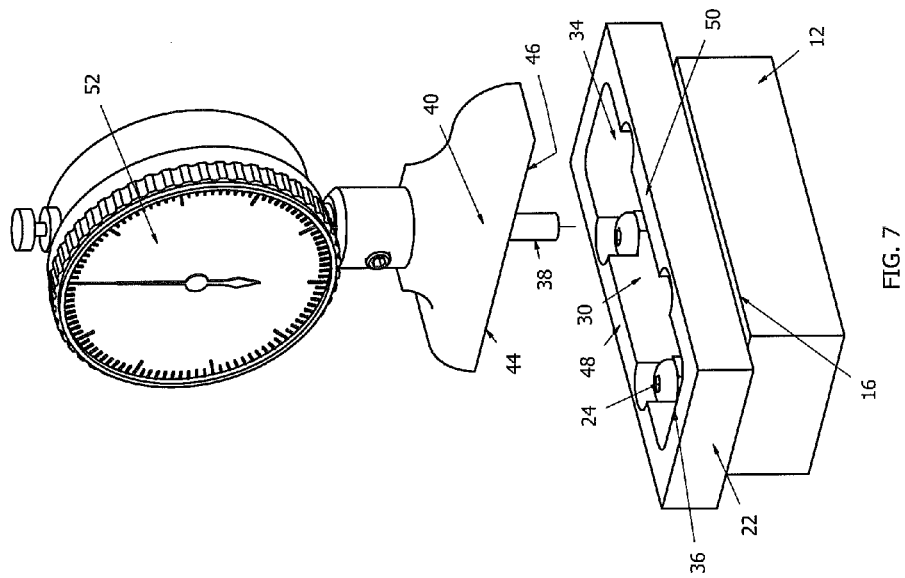
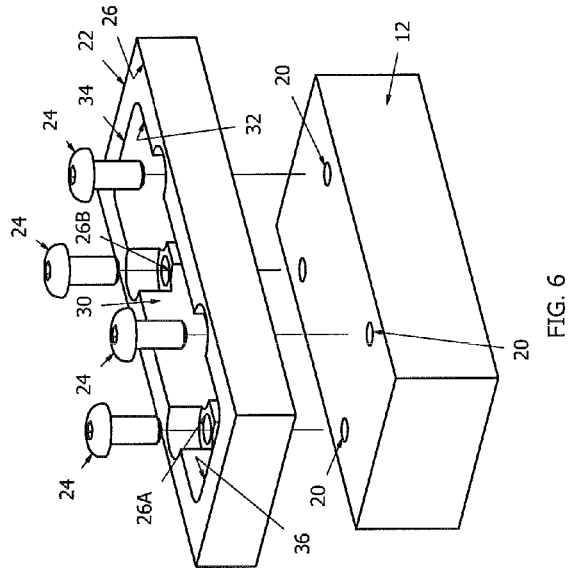
FIG. 7
FIG. 6

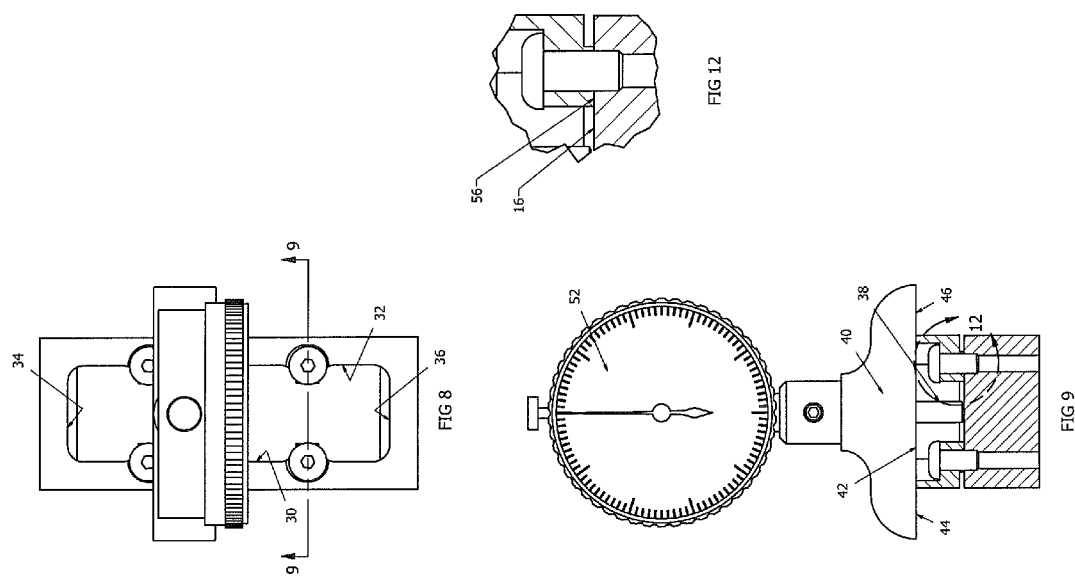

US 8,479,568 B1

APPARATUS FOR MEASURING VARIATIONS IN FLATNESS

CROSS REFERENCE TO RELATED APPLICATIONS

This application claims the benefit of U.S. Provisional Application No. 61/311,020, filed Mar. 5, 2010, the disclosure of which is hereby incorporated by reference.

BACKGROUND OF THE INVENTION

1. Field of the Invention

This invention relates to an apparatus for measuring variations in flatness of an Almen strip holding surface used in quality control of shot peening operations.

2. Description of the Background of the Invention

Shot peening, blast cleaning, and similar operations are well known and are widely practiced. However, the intensity of shot peening or blast cleaning must be carefully controlled, as either too great or insufficient shot peening or blasting can be detrimental. Accordingly, a process using an "Almen strip" has been developed in which a flat metal strip having standardized dimension is secured to a flat holding surface, and then either peened or blasted for a predetermined time. Accordingly, residual stresses are introduced into the Almen strip, and the Almen strip relaxes into a natural curve when removed from the holding surface. The degree of curvature is an indication of the intensity of the peening or blasting. Well known devices are widely available for reading this curvature, thus providing a record of the intensity of the subsequent peening process. In order that such readings be reproducible, it is necessary to assure that the surface upon which the Almen strip is supported during peening is absolutely flat (within a predetermined tolerance). Any variation of the surface, even along the edges, can result in corrupted readings. The edges of the holding surface are particularly important, since they are more likely to be damaged by repeated peening into a non-flat state. Another factor influencing the readings of Almen strips is variation in the location of the hold down screws which secure the Almen strip to the holding surface.

U.S. Pat. No. 6,148,532 discloses a gage measuring flatness of an Almen strip holding surface. However, the apparatus disclosed in this patent permits measurement only along the center line of the holding surface and cannot measure flatness along the edges. Also, there is no way to confirm that the apertures receiving the Almen strip hold down screws are within tolerance.

SUMMARY OF THE INVENTION

According to the present invention, a gaging block having substantially parallel upper and lower surfaces is secured to the holding surface of an Almen strip holder by screw fasteners extending through openings in the gaging block and engaging the same openings that are used by the hold down screws to secure Almen strips to the holding surface. At least some of the apertures are made oversized by an amount equal to the tolerance required of the distance between the Almen strip hold down screws. Accordingly, the gaging block cannot be mounted on the holding surface if the distance between the apertures receiving the Almen strip retaining screws are out of tolerance. The gaging block is provided a central aperture which conforms to the dimensions of the holding surface. A plunger is slidably mounted in a cross member that has end portions that are slidably supported by the upper surface of the gaging block. A dial indicator responds to movement of the plunger to provide readings indicative of the variations in the surface of the Almen strip holding surface. Accordingly, it can be quickly determined if the variations in flatness are out of tolerance. The plunger, due to the fact that the cross member is sufficiently long to permit movement of the plunger between and along all of the edges of the aperture, can contact the edges of the Almen strip holding surface. Thus, the dial indicator displays variations in the relative flatness along these edges. Accordingly, the present invention can be used to establish flatness over the entire Almen holding surface, even along the edges thereof.

BRIEF DESCRIPTION OF THE DRAWINGS

FIG. 1 is a view in perspective of a mock up (or scrap part) of a typical part which is to be shot peened, with an Almen strip holding fixture mounted thereon;

FIG. 2 is a view similar to FIG. 1, but with the Almen strip partially removed from the Almen strip holding fixture;

FIG. 3 is a top plan view of the Almen strip holding fixture illustrated in FIGS. 1 and 2;

FIG. 4 is a cross-sectional view taken substantially along lines 4-4 FIG. 3;

FIG. 5 is an enlarged cross-sectional view of the circumscribed portion of FIG. 4;

FIG. 6 is an exploded view in perspective of the holding fixture and gaging block used in the present invention;

FIG. 7 is a view in perspective of the gaging block mounted on a holding fixture, with the cross-member, plunger and readout gage of the present invention exploded off of the fixture;

FIG. 8 is a top plan view of the assembly illustrated in FIG. 7, but with the cross-member, plunger and dial indicator in the operative position;

FIG. 9 is a view taken substantially along lines 9-9 of FIG. 8;

FIG. 12 is an enlargement of the circumscribed portion of FIG. 9.

DETAILED DESCRIPTION OF INVENTION

Figure 11:
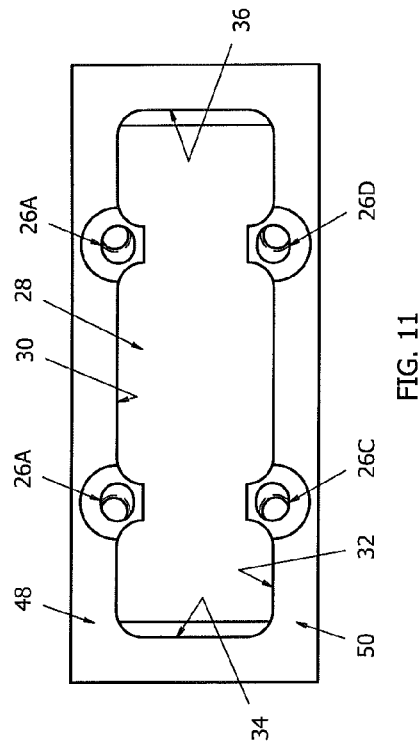
FIG. 11 is a top plan view of the gaging block used in the present invention.
Figure 10:
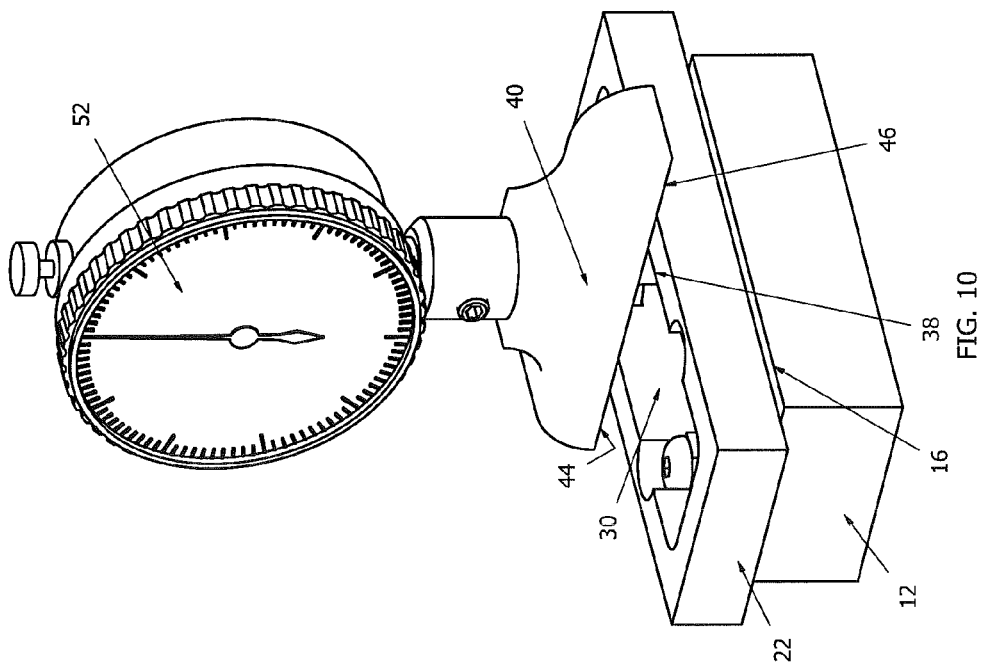
FIG. 10 is a view in perspective of the completed assembly, and with the cross-member, plunger and dial indicator in their normal operating position.

Referring now to FIGS. 1-5, a typical part that is to be peened is illustrated at 10. The part 10 may be a mock up of the actual part or a scrap part to which an Almen gage holding fixture generally indicated by the numeral 12 is secured, with an Almen strip 14 installed thereon. In the peening of complex parts, such as part 10, it is necessary to make intensity readings using the fixture 12 of a part or mock up as near to the actual part as possible. In FIG. 2, the Almen strip 14 is shown partially removed from the Almen strip holding surface 16, which must be as flat as possible, usually within quite tight tolerances, to avoid corruption of the intensity measurement. During setup of the peening of a part similar to part 10, the scrap part or mock up with the Almen strip supporting fixture 12 and Almen strip 14 installed thereon is placed in the peening chamber and peened for a predetermined time. The Almen strip 14 is then removed from the fixture 12 and the curvature is read by any standard commercially available gages, to determine the curvature of the Almen strip after peening. The degree of this curvature provides an indication of peening intensity. If necessary, the peening parameters can be adjusted, and new intensity measurements made, until the desired intensity is obtained. In order for the intensity measurements to be valid and repeatable, it is desirable that the holding surface 16 be as flat as possible, normally within relatively tight tolerances. Since the fixture 12 is exposed to peening, the flatness of the surface 16 may erode over time, thus corrupting intensity measurements. Four retaining screws 18 are threadedly received within corresponding bores 20 (FIG. 6) in the fixture 12 to receive the screws 18. As most clearly illustrated in FIGS. 4 and 5, these fasteners 18 catch the Almen strip 14 along its edges to hold the Almen strip in place.

Periodically, it is necessary to remove the fixture 12 from the scrap part or mock up 10 and check the flatness of the holding surface 16 to assure that the holding surface 16 is flat within the required tolerances. The flatness of the holding surface eventually deteriorates, particularly along the edges thereof, and any deviation in flatness, even along the edges, may result in corrupted intensity readings. Accordingly, periodically, the fixture 12 is removed from the part 10 and taken aside to confirm that the holding surface 16 is flat within tolerance.

According to the invention, flatness of the surface 16 is checked by mounting a gaging block 22 on fixture 12 by screws 24. It will be noted that the screws 24 are somewhat longer than the screws 18 to permit them to extend through the gaging block 22 and engage the openings 20. The gaging block 22 is further provided with openings 26a, 26b, 26c, and 26d which receive the screws 24 to permit the gaging block 22 to be secured to the fixture 12. The gaging block 22 has an upper measuring surface 26 and lower surface 28. Each of the openings 26a-d are circumscribed by a projection 56 that extends downwardly from the surface 28 to engage the holding surface 16. It is important that the engagement surface defined by the portion of the projections 56 that engage surface 16 be flat and parallel with respect to the upper surface 26 within the tolerance of flatness of the holding surface 16. According to the invention, openings 26 a-d are slightly oblong, the eccentricity of the openings being equal to the permitted tolerance between the openings 26 a-d. Accordingly, a check is automatically made to assure the openings 20 are within tolerance, since the gaging block 22 cannot be mounted on the surface 16 if this distance is out of tolerance. The gaging block is provided with a central aperture 28, which is bounded by side edges 30, 32 and end edges 34, 36.

Flatness of the surface 16 is measured by displacement of a plunger 38, which is slidably mounted for vertical reciprocation within a cross member 40. The cross member 40 is sufficiently long that it extends across the aperture 28 as the plunger is moved from one of the side edges 30 to the other side edge 32. The cross member 40 includes lower surface 42, which includes coplanar end portions 44, 46 which are flat within the tolerance required for flatness surface 16. End portion 44 is maintained in engagement with upper surface 48 of one side of the gaging block 22, and the other end portion 46 is made in a sliding engagement with the upper surface 50 of the other side of the gaging block aperture 28. This placement of the plunger is displayed on a dial indicator 52. Accordingly, the plunger 38 may be moved randomly over the holding surface 16 upon which the Almen strip 14 is mounted during use and, in particular, the plunger 30 may by moved toward and away from, and along, each of the sides 30, 32, 34 and 36 of the aperture 28, thereby permitting the indicator 52 to display any variations in flatness of the holding surface 16. The test operator is able to monitor the dial indicator 52 as the plunger 38 is moved over and across the surface 16, thereby permitting detection of any variation in flatness of the surface 16.

This invention is not limited to the details above, but may be modified within the scope of the following claims.

What is claimed is:

1. Apparatus for measuring variations in the flatness of an Almen strip supporting fixture having an Almen strip holding surface said apparatus for measuring comprising:
    a gaging block having parallel surfaces, said gaging block defining an aperture extending between said parallel surfaces and being bounded between opposite side edges and opposite end edges said edges bounding an almen strip, one of said parallel surfaces engaging said holding surface, said aperture exposing said holding surface, said gaging block being secured to said fixture to prevent relative movement between said gaging block and said fixture; and
    a cross member extending across said aperture and carrying a probe extending through said aperture and engaging said holding surface and movable relative thereto to measure variations in flatness of said surface, said cross member including opposite end portions slidably engaging the other of said parallel surfaces whereby said cross member and said probe are movable across said holding surface between said side edges and said end edges, said Almen strip supporting fixture including openings for receiving fasteners for holding an Almen strip on said strip holding surface of said Almen strip supporting fixture, said gaging block having openings adapted for alignment with said openings on said Almen strip supporting fixture, and fasteners extending through said openings in said gaging block and said Almen strip supporting fixture.

2. Apparatus as claimed in claim 1, wherein at least some of said openings in said gaging block are oversize by an amount equal to the tolerance permitted between the openings of said Almen strip supporting fixture, whereby if the spacing between openings in the gaging block are out of tolerance the gaging block cannot be fastened to the fixture.

3. Apparatus as claimed in claim 1, wherein said cross member is sufficiently long that the probe can be moved from one of said side edges to the other side edge while maintaining said cross member in sliding engagement with the other of said parallel surfaces.

4. Apparatus as claimed in claim 3, wherein said probe operates a read-out gage to visually display displacement of said probe to thereby provide a visual indication of variations in the contour of said surface.

5. Apparatus for measuring variations in the flatness of an Almen strip supporting fixture having an Almen strip holding surface said apparatus for measuring comprising:
    a gaging block having parallel surfaces, said gaging block defining an aperture extending between said parallel surfaces and being bounded between opposite side edges and opposite end edges, one of said parallel surfaces engaging said holding surface, said aperture exposing said holding surface;
    said Almen strip supporting fixture including openings for receiving fasteners for holding an Almen strip on said strip holding surface of said Almen strip supporting fixture, said gaging block having openings adapted for alignment with said openings on said Almen strip supporting fixture and fasteners extending through said openings in said gaging block and said Almen strip supporting fixture; and
    a cross member extending across said aperture and carrying a probe extending through said aperture and engaging said holding surface and movable relative thereto to measure variations in flatness of said surface, said cross member including opposite end portions slidably engaging the other of said parallel surfaces whereby said cross member and said probe are movable across said holding surface between said side edges and said end edges.

* * * * *